C. L. & F. BROUGH.
Horse Hay-Rakes.

No. 134,353. Patented Dec. 31, 1872.

Attest
Jno. Hunter
John Jones

Inventor
Charles L. Brough
Frank Brough
By Wood & Boyd
Attys.

UNITED STATES PATENT OFFICE.

CHARLES L. BROUGH AND FRANK BROUGH, OF DELPHI, INDIANA.

IMPROVEMENT IN HORSE HAY-RAKES.

Specification forming part of Letters Patent No. 134,358, dated December 31, 1872.

*To all whom it may concern:*

Be it known that we, CHARLES L. BROUGH and FRANK BROUGH, of Delphi, in the county of Carroll and State of Indiana, have invented new and useful Improvements in Horse Hay-Rakes, of which the following is a specification:

This invention consists of a certain combination and arrangement of parts, as hereinafter specified and claimed; the object of our invention being to relieve the attendant from the labor of dumping, which, when the gathering is heavy, is very tiresome, and to cause the accomplishment of this by the ordinary forward movement of the horse; all of which will more fully appear by reference to the accompanying drawing, in which—

Figure 1:
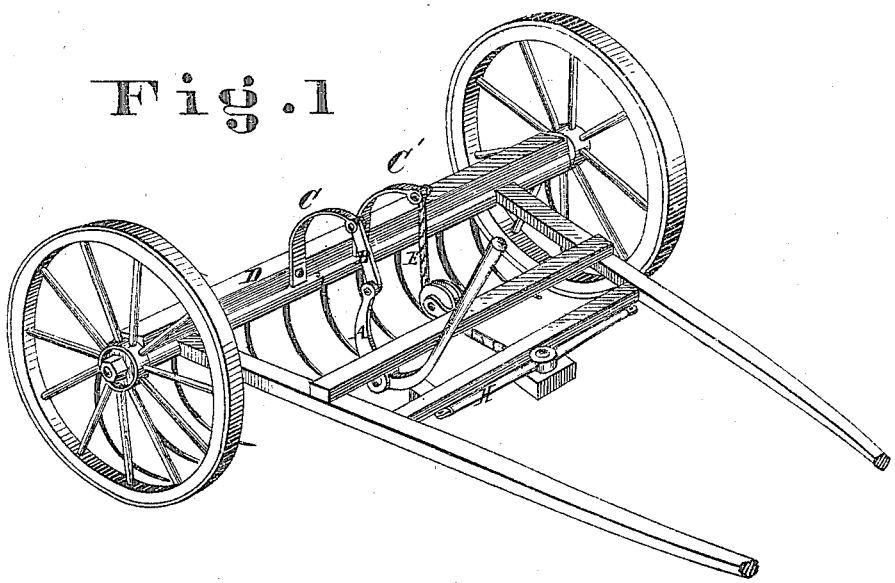
Figure 2:
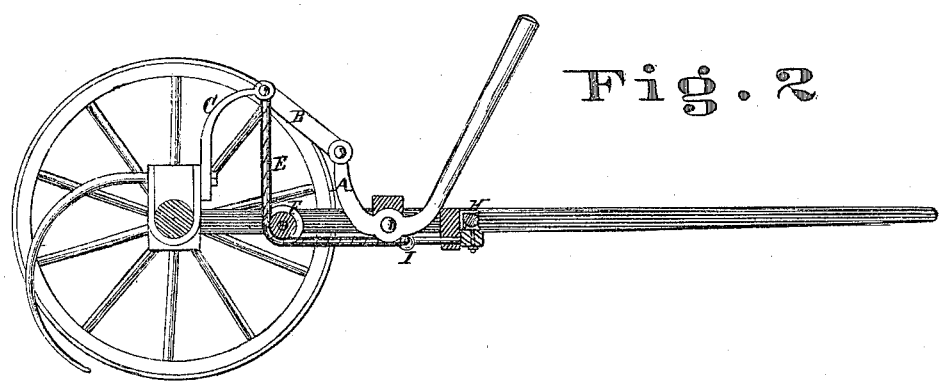

Figure 1 is a perspective view of a rake having the devices embodying our invention attached, and Fig. 2 is a vertical section of the same through a line at one side of the attachment.

Our invention is shown attached to a rake substantially similar in its operation to that shown and described in Letters Patent No. 106,385, issued to G. M. L. McMillen, August 14, 1870, for an improvement in horse hay-rakes, and having locking devices A B C substantially the same as therein shown and claimed.

The letter C' in Fig. 1 is the dumping-lever attached to the bar or axle which carries the teeth of the rake, and C is a lever attached to the axle or bar carrying the rake-teeth, and is a part of the locking-lever. E is a chain or other suitable draft device, one end of which is attached to the upper end of the lever C or C', and the other is carried down under a pulley, F, and thence forward to the whiffletree H, to the center of which it is attached, or preferably to the end of a rod which extends to and is connected at its forward end to the whiffletree. Other loose pulleys may be employed between F and the whiffletree.

The horse being hitched to the whiffletree, the draft for operating the rake is transmitted through the chain E and lever C; but the locking device operating as described in said Letters Patent No. 106,385, this draft will not elevate the teeth until unlocked. As soon as this is done the draft of the horse will draw down the upper end of lever C, and thus elevate the teeth and dump their gatherings.

In this operation it is obvious that the horse and the whiffletree will advance from the machine but only a few inches, and, as soon as the load is dumped, the weight of the teeth, &c., will run the machine forward on the horse and relock the same; but, to assist this operation, it is desirable, and in some machines may be necessary, for the attendant to push the handle of the locking-lever forward, which can be easily done while the draft is on the chain, or it can be accomplished by slackening the pace of the horse.

In order to avoid raising the teeth too high, or the parts being strained when the machine is being moved with the teeth elevated, the draft-chain E is provided with a shoulder, I, which bears against the cross-bar or other device supporting its forward end when the lever C is sufficiently depressed to elevate the teeth to the desired point.

Having thus described our invention, we claim—

The dumping-lever C' and its chain E having the stop I, said chain or rope passing around a pulley, F, and connected to the whiffletree H, in combination with the locking-lever consisting of the lever C attached to the axle or bar carrying the rake-teeth, the link B, and lever A, all constructed, arranged, and operating substantially as described.

In testimony whereof we have hereunto set our hands.

CHARLES L. BROUGH.
FRANK BROUGH.

Witnesses:
JOHN G. TROXELL,
H. W. STANSEL.